(12) United States Patent
Akhavan-Tafti et al.

(10) Patent No.: US 6,545,102 B1
(45) Date of Patent: Apr. 8, 2003

(54) POLYMER-SUPPORTED PHOTOSENSITIZERS

(75) Inventors: Hashem Akhavan-Tafti, Howell, MI (US); Richard S. Handley, Canton, MI (US); Mark D. Sandison, Dearborn, MI (US); Randall K. Larkin, West Bloomfield, MI (US)

(73) Assignee: Lumigen, Inc., Southfield, MI (US)

( * ) Notice: Subject to any disclaimer, the term of this patent is extended or adjusted under 35 U.S.C. 154(b) by 0 days.

(21) Appl. No.: 09/965,692

(22) Filed: Sep. 27, 2001

(51) Int. Cl.$^7$ .............................. C08C 19/24; C09K 3/00
(52) U.S. Cl. .................... 525/340; 525/217; 525/292.9; 526/274; 526/278
(58) Field of Search ................................ 525/340, 217, 525/292.9; 526/274, 278

(56) References Cited
U.S. PATENT DOCUMENTS 5,474,725 A * 12/1995 Akhavan-Tafti et al. .... 525/340

* cited by examiner

Primary Examiner—James J. Seidleck
Assistant Examiner—Olga Asinovsky
(74) Attorney, Agent, or Firm—Richard Handley

(57) ABSTRACT

Improved polymer-immobilized photosensitizer are disclosed as well as methods of preparing and using them. The polymer-immobilized photosensitizers comprise a cross-linked polymer backbone, a plurality of cationic ammonium or phosphonium groups covalently bound to the polymer backbone and an immobilized photosensitizer. The average total number of carbon atoms in the ammonium or phosphonium group is at least four and preferably at least 12. The photosensitizer can be either covalently or ionically bound to the polymer. Polymer-supported photosensitizers of the invention are unexpectedly superior in catalyzing the photosensitized oxidation of compounds containing carbon-carbon double bonds.

46 Claims, 2 Drawing Sheets

POLYMER-SUPPORTED PHOTOSENSITIZERS

FIELD OF THE INVENTION

Figure 1:
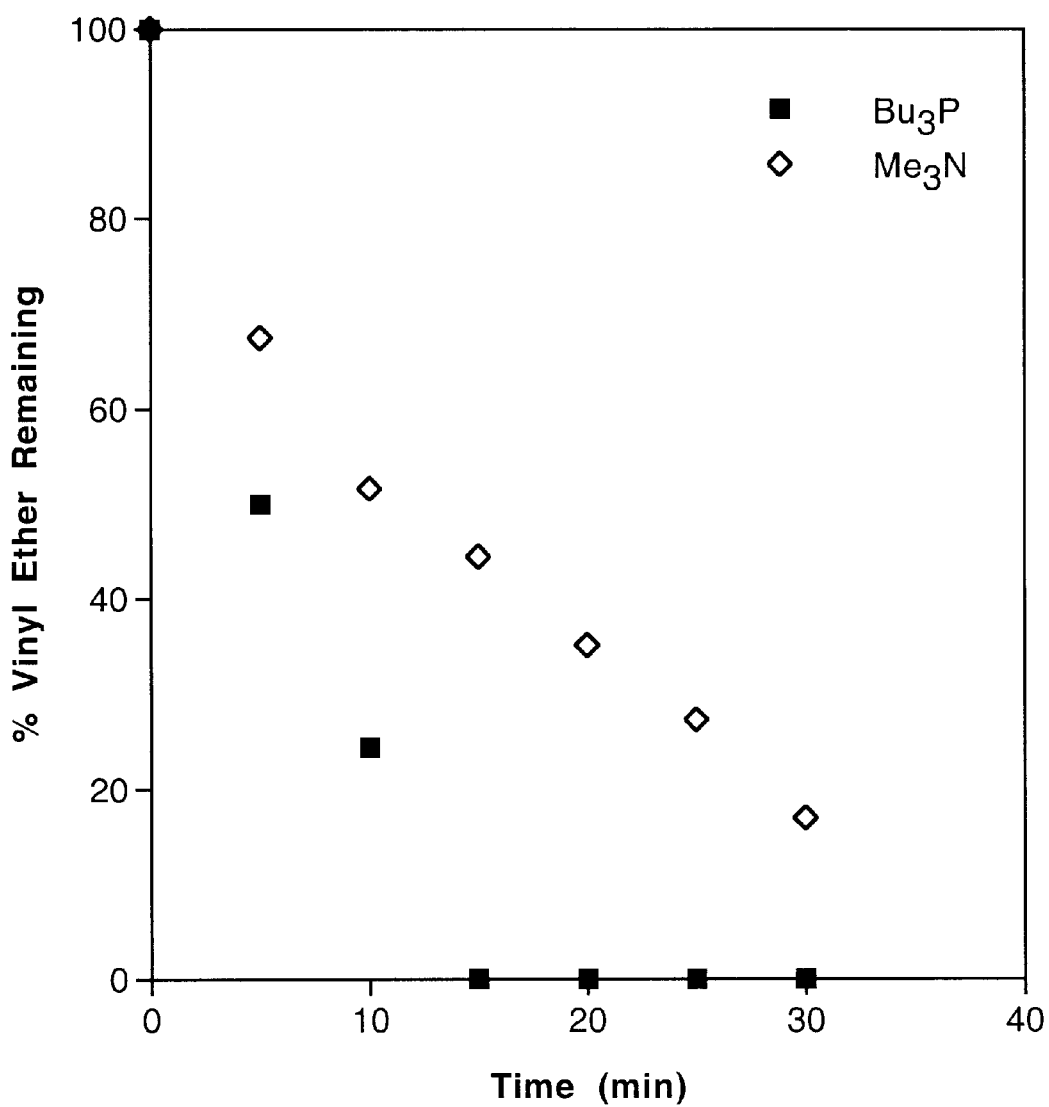

This invention relates to synthetic polymers useful for preparing polymer-immobilized compounds including polymer-supported photosensitizers. The immobilized compounds can be covalently bound to the polymer or bound by electro-static attraction to cationic groups covalently bound to the polymer backbone. The polymer-immobilized compounds have superior properties when used as photosensitizers. The invention further relates to methods of generating singlet oxygen with the polymer-immobilized photosensitizers for use in synthetic organic chemistry and other applications.

BACKGROUND OF THE INVENTION

U.S. Pat. No. 4,104,204 discloses polymer-immobilized photosensitizing dyes for producing singlet oxygen. The immobilized dyes are prepared by mixing commercial ion exchange resins with the free ionic dye and filtering off the resulting polymer. Dye is bound through attraction of opposite charges. An anion exchange resin IRA-400™ (Rohm & Haas, Philadelphia) was used to bind the anionic dye Rose Bengal. The resin is a cross-linked polystyrene polymer to which trimethylammonium groups are attached by chloromethylation of the aromatic rings followed by substitution of the chlorine with trimethylamine.

U.S. Pat. No. 4,315,998 discloses covalently linked polymer-immobilized photosensitizing dyes for producing singlet oxygen. The preferred polymer was chloromethylated polystyrene crosslinked with divinylbenzene.

Polymer-immobilized photosensitizers perform optimally when placed in a solvent which causes substantial swelling or physical expansion of the polymer matrix. Prior art polymer-immobilized photosensitizers either do not swell appreciably or swell only in water-immiscible organic solvents. Polymer-immobilized photosensitizers which swell in water or water-miscible organic solvents are needed.

U.S. Pat. No. 3,065,272 discloses vinylbenzylphosphonium ion monomers stated to be useful in the preparation of polymers. Various organic or inorganic anionic counterions are described U.S. Pat. No. 3,958,995 discloses the preparation of poly(styrene-co-vinylbenzyltributylphosphonium chloride-divinylbenzene). The polymer contained a 49.5/49.5/1.0 ratio of monomer units.

U.S. Pat. No. 4,069,017 discloses a poly (vinylbenzyltrioctylphosphonium chloride) polymer useful in mordant compositions. The polymer is used in an assay for bilirubin.

European Patent Application EP348532A discloses poly (vinylbenzyltributylphosphonium chloride-co-divinylbenzene). The polymers contain various percentages of divinylbenzene units for crosslinking.

U.S. Pat. No. 5,431,845 discloses water-soluble poly (vinylbenzyltributylphosphonium chloride) polymers including one in which Rose Bengal is covalently linked. The polymer was prepared by reacting polyvinylbenzyl chloride with a limiting amount of the dye followed by reaction with an excess of tributylphosphine. The polymer thus comprised a non-cross-linked poly (vinylbenzyltributylphosphonium chloride in which a small percentage of the monomer units contained Rose Bengal molecules instead of tributylphosphonium groups.

Polyvinylbenzyldiethylphenylphosphonium salts are disclosed in a patent only as a copolymer with styrene (Jpn. Kokai Tokkyo Koho, JP 63243964 A2 11 Oct 1988).

Polyvinylbenzyltriphenylphosphonium salts are well known in the literature, being used as surfactants, phase-transfer catalysts and reagents in organic synthesis. Copolymers of polyvinylbenzyltriphenylphosphonium salts with acrylic acid, butadiene and divinylbenzene are known. None of the foregoing polymers or copolymers have been used as enhancers of chemiluminescence. No reports of covalently attached fluorescers to these polymeric phosphonium salts have been made.

BRIEF DESCRIPTION OF THE INVENTION

We have developed certain synthetic polymers useful for preparing polymer-immobilized compounds. The polymers have been used to immobilize photosensitizing dyes thereon. The polymers contain a plurality of phosphonium or ammonium cationic groups and are cross-linked to render the polymer insoluble in common solvents. The immobilized compounds are either bound covalently through a linker to the polymer backbone or are bound by electrostatic attraction to cationic ammonium or phosphonium groups covalently bound to the polymer backbone. The polymers and polymer-immobilized compounds have superior properties when compared to known polymer-supports. Polymer-supported photosensitizers of the invention are unexpectedly superior in catalyzing the photosensitized oxidation of compounds containing carbon-carbon double bonds.

IN THE DRAWINGS

FIG. 1 is a plot depicting the relative rates of photosensitized oxidation of a test vinyl ether compound using as the photosensitizer either a polymer-immobilized dye of the present invention and bearing tributyl-phosphonium groups or a polymer-immobilized dye bearing trimethylammonium groups.

Figure 2:
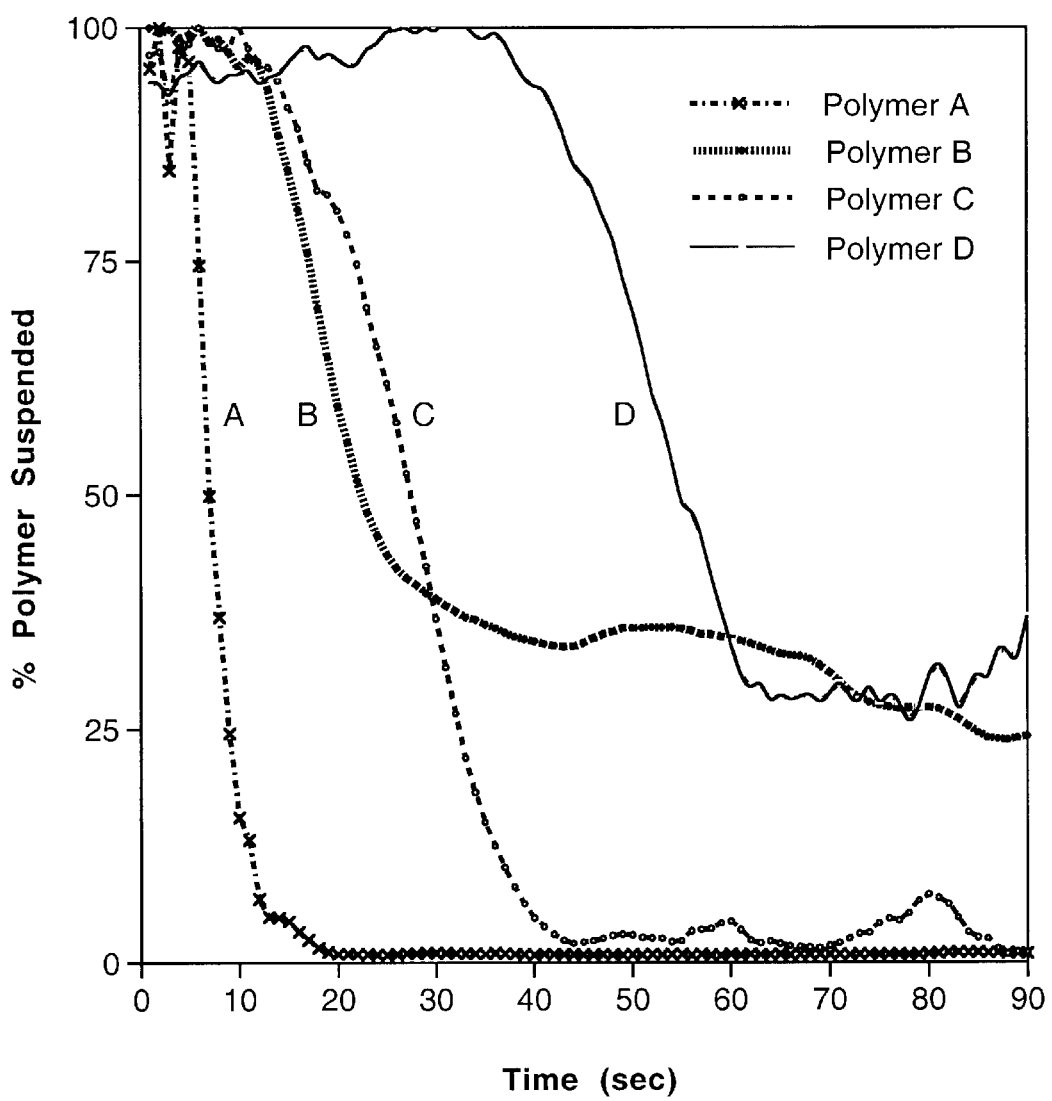

FIG. 2 is a plot of the settling time of a suspension of each of four polymers as measured by the rate of decrease of fluorescence of a stirred mixture upon stopping the magnetic stirrer. The four polymers which were compared were: A—the trimethylammonium polymer of Example 6, B—the tributylphosphonium polymer of Example 1, C—the trioctylphosphonium polymer of Example 3, D—the tributylphosphonium polymer of Example 5. Fluorescence was monitored at 640 nm with excitation at 530 nm in 1 second intervals from the point at which stirring was stopped.

DETAILED DESCRIPTION OF THE INVENTION

The present invention concerns certain synthetic cationic polymers useful for preparing improved polymer-immobilized compounds. In particular, the polymers are useful to immobilize photosensitizing dyes thereon. Preferred polymer-immobilized compounds comprise a cross-linked polymer backbone, a plurality of cationic ammonium or phosphonium groups covalently bound to the polymer backbone and photosensitizer molecules. A preferred polymer-immobilized photosensitizer comprises a cross-linked polymer backbone to which is bound a plurality of photosensitizer groups, preferably anionic photosensitizers and a plurality of cationic groups $^+QR_3$ wherein Q is selected from phosphorus and nitrogen, each R is independently a straight, branched or cyclic alkyl group of 1 to about 20 carbons or an aralkyl group and the average total number of carbon atoms in the group $QR_3$ is at least four. The immobilized photosensitizer or other compound can be bound to the polymer backbone covalently through a linker or electrostatically by attraction to the cationic quaternary ammonium or phosphonium groups. In polymer-immobilized photosensitizers of the invention the quaternary group $^+QR_3$ is either covalently linked to the polymer backbone or is electrostatically bound by attraction to covalently linked anionic photosensitizer groups. The polymers are cross-linked and contain a sufficient percentage of a cross-linking monomer unit to render the polymer insoluble in common solvents. The polymers and polymer-immobilized compounds have superior properties when used in their intended application when compared to known polymer-supports and polymer-immobilized compounds. A key feature of the polymers of the invention is that the quaternary ammonium or phosphonium groups contain an average number of total carbon atoms on the three substituents, excluding the linking substituent, which is greater than three. Polymer-supported photosensitizers of the invention are unexpectedly superior in catalyzing the photosensitized oxidation of compounds containing carbon-carbon double bonds.

Insoluble precursor polymer supports useful as the starting materials for preparing polymer-immobilized compounds and polymer-immobilized photosensitizers can comprise any of several different cross-linked polymer backbones. Exemplary polymers are disclosed in EP 348532 relating to anion exchange resins and EP 663409 and having the general formula:

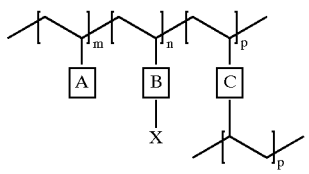

where A, B and C together with the two carbons of the polymer chain represent the three different possible ethylenically unsaturated monomer units comprising the polymer. It is to be understood that the polymer chain is not limited to the —$CH_2CH_2$— group depicted but also includes alkyl substituted chains, particularly with methyl groups. B and C are each either a bond or a divalent linker group preferably selected from alkylene, arylene, aralkylene, carboxyl —COO—, oxycarbonyl, —OC(=O)—, and carboxamide —C(=O)NR—. A is a monovalent group preferably selected from hydrogen, halogen, alkyl, aryl, aralkyl, carboxyl ester —COOR, oxycarbonyl, —OC(=O)R, and carboxamide —C(=O)$NR_2$. The symbols m, n and p represent the mole fraction of the respective monomer units comprising the polymer, i.e. the total m+n+p=1. The amount of cross-linking (p) is typically from of 0.01 to about 0.1 or 1–10 mole percent. The fraction m is from 0 to about 0.95, and when not 0 more usually from 0.5 to 0.95. The fraction n is from about 0.05 to about 0.95, and when m is not 0, then it is from about 0.05 to about 0.5. The group X is a reactive leaving group capable of being displaced in a nucleophilic displacement reaction. Preferred X groups are halogens and sulfonate esters.

A preferred group of precursor polymers for use in preparing polymer-immobilized photosensitizers consist of polymers wherein A is a phenyl group, B is a benzyl group and C is a p-phenylene group having the formula:

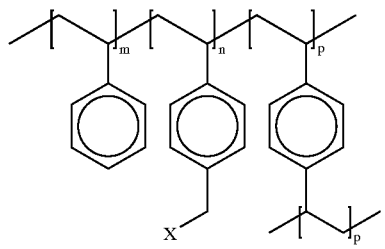

wherein the amount of cross-linking (p) is from about 0.1 to about 0.01, m is from about 0.75 to about 0.95, n is from about 0.05 to about 0.25 and the group X is a halogen atom. A range of polymers of this type are commercially available, one example being a polymer designated Merrifield's resin.

Reaction of the precursor polymer with at least 1 amine or phosphine of the formula $QR_3$ produces a cationic polymer in which some of the reactive groups are converted to the quaternary ammonium or phosphonium $^+QR_3X^-$. The degree of replacement is typically at least 50% and more usually at least 75% of the theoretical maximum. A preferred polymer-immobilized photosensitizer is prepared by substantially complete replacement of the X group resulting in a polymer which can be represented by the formula

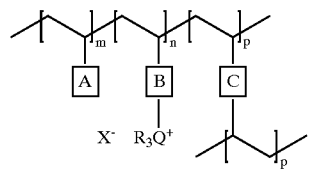

wherein Q is selected from phosphorus and nitrogen, each R is a straight, branched or cyclic alkyl group of 1 to about 20 carbons or an aralkyl group. The average total number of carbon atoms in the group $QR_3$ is from 4 to about 40, but more preferably is from about 12 to about 30 carbon atoms. In one embodiment all groups $QR_3$ are identical. In another embodiment two or more different $QR_3$ groups are present in the polymer. Typically all three R groups attached to Q are the same, such as a tributylammonium or tributylphosphonium group, but they can differ as well. A preferred compound $QR_3$ is a trialkylamine or trialkylphosphine. The counter-ion X is derived from the precursor polymer and is preferably a halide such as chloride, bromide or iodide or a sulfonate such as p-toluenesulfonate, methanesulfonate or trifluoromethanesulfonate. A preferred cationic polymer in which replacement of the reactive group is substantially complete has the formula:

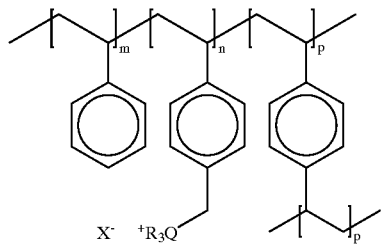

where Q, R, X, M, N, and p are as defined above.

One class of polymer-immobilized photosensitizers is prepared by reaction of the cationic polymer with an anionic photosensitizer carrying at least one negative charge binds or immobilizes the photosensitizer to the polymer by ion exchange of the anion $X^-$ for the sensitizer $Sens^-$ producing the polymer-immobilized photosensitizer. In the ion exchange process the anion associated with the polymer is substantially converted to the form containing the sensitizer as counter ion but can contain some of the original anion. The degree of replacement is typically at least 50% and more usually at least 75% of the theoretical maximum. Suitable photosensitizers for the photosensitized generation of singlet oxygen are known in the art. U.S. Pat. Nos. 4,104,204 and 4,315,998 for example disclose several photosensitizers including Rose Bengal, Eosin Y, Alizarin Red S, Congo Red, and Orange G. Also useful are fluorescein dyes, rhodamine dyes, Erythrosin B, chlorophyllin trisodium salt, salts of hemin, hematoporphyrin, Methylene Blue, Crystal Violet and Malachite Green.

Polymer-immobilized sensitizers in accordance with one embodiment of the invention are represented by the formula below where m, n, p, A, B, C, Q and R are defined above and Sens represents a sensitizer moiety. The polymer chain is depicted below as a —$CH_2CH_2$— group can be alkyl substituted particularly with methyl groups.

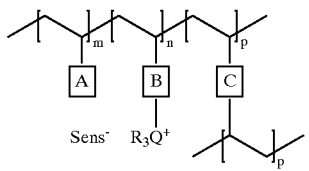

One class of preferred polymer-immobilized sensitizers has the formula below where m, n, p, Q, R and Sens are as defined above.

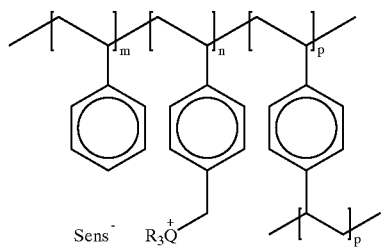

Preferred polymer-immobilized photosensitizers are prepared by dissolving the photosensitizer in a solvent and combining the solution with the polymer. After a brief mixing period the polymer is filtered off and washed with fresh solvent. Suitable solvents include water, lower alcohols and mixtures thereof but include any solvent in which the photosensitizer dissolves.

In particular, a preferred group of polymer-immobilized photosensitizers prepared by the above method and useful in accordance with the present invention are represented by the formula:

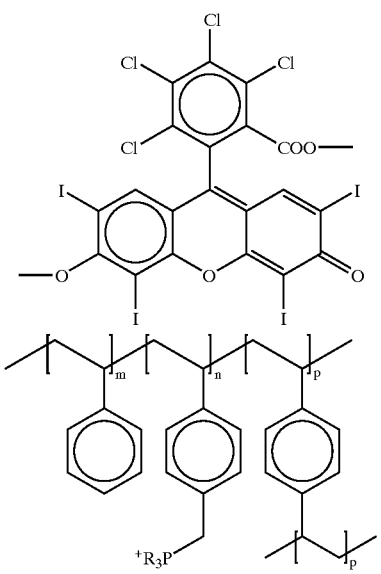

Polymers in this preferred group contain alkyl groups of at least four carbon atoms as the R groups, m is from about 0.75 to about 0.95, n is from about 0.05 to about 0.15 and p is from about 0.01 to about 0.1. As shown the sensitizer Rose Bengal is the counter ion of the phosphonium group.

In another embodiment, a polymer immobilized sensitizer comprises a polymer backbone to which are linked phosphonium or ammonium groups and covalently linked photosensitizer molecules. Polymer-immobilized sensitizers of this type are exemplified by the formulas below where A, B, C, Q, R, X and Sens are as defined above and l, m, n, and p represent the mole fraction of the respective monomer units comprising the polymer, i.e. the total l+m+n+p=1. The amount of cross-linking (p) is typically from of 0.01 to about 0.1 or 1–10 mole percent. The fraction m is from 0 to about 0.95, and when not 0 more usually from 0.5 to 0.95. The fractions l and n are each from about 0.05 to about 0.95, and when m is not 0, then they are each from about 0.05 to about 0.5.

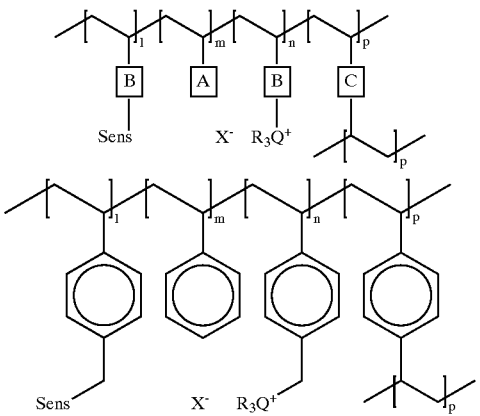

Polymer-immobilized photosensitizers of this type are prepared by reacting the precursor polymer with a specified limiting amount of the photosensitizer in a solvent for a period of time and at a temperature sufficient to effect covalent bonding of the photosensitizer to the polymer by displacement of some of the leaving groups and also with at least one amine or phosphine compound $QR_3$ in a solvent to displace additional leaving groups with $QR_3$ thereby forming quaternary ammonium or phosphonium groups $^+QR_3X^-$. The degree of replacement with the phosphine or amine is typically at least 50% of the available reactive groups and more usually at least 75%. Replacement of the reactive leaving groups with the sensitizer and phosphine or amine can be done concurrently or consecutively in either order. In one embodiment, the precursor polymer is first reacted with the limiting amount of the photosensitizer and then with the amine or phosphine. In a preferred polymer of this class, the X groups remaining after covalent bonding of the photosensitizer are substantially completely converted to quaternary ammonium or phosphonium groups. The fraction of reactive groups to which photosensitizer molecules are covalently bonded in the first step can be from about 0.01% to about 50% of the available reactive groups, preferably from 0.1% to about 20%.

Polymer-immobilized photosensitizers can have any convenient physical form. In general it is desirable for the polymer to have a high surface area per unit weight. For this reason it is preferred that the polymer is used in the form of small particles, generally of diameter of less than about 0.2 mm. In some applications the polymer can also take the form of a sheet or film or a larger diameter particle or bead.

In further aspects of the present invention, the polymer-immobilized photosensitizers are used in a method for generating singlet oxygen by reacting any of the polymer-immobilized photosensitizers described above with oxygen in the presence of visible light which is absorbed by the photosensitizer. The photochemical generation of singlet molecular oxygen ($^1O_2$) by dye sensitization with visible light has been widely known and used in preparative organic chemistry. Use of a polymer-immobilized photosensitizer facilitates easy removal of the sensitizer from the reaction and simplifies recovery and purification of reaction products. The heterogeneous nature of the reaction, however, can slow the rate of reaction compared to the rate of homogeneous photosensitized oxidation. The improved polymer-immobilized photosensitizer catalysts of the present invention correct this deficiency.

The types of preparative reactions for which the polymer-immobilized photosensitizers of the present invention are useful are known in the art. Representative examples of these types of reactions are described for example in *Singlet Oxygen*, H. H. Wasserman and R. W. Murray, eds., Academic Press, New York, 1979, Chapters 6–12. These include the 1,2-cycloaddition of singlet oxygen with electron-rich alkenes, e.g. vinyl ethers, vinyl sulfides and enamines, to form the respective dioxetane derivatives, the ene reaction with other non-activated alkene to form an allylic hydroperoxide, 4+2 cycloaddition of singlet oxygen with dienes, including cyclic and heterocyclic dienes, to form six-membered ring endoperoxides, oxidation of sulfides to form sulfoxides and sulfones, and reaction of heterocyclic compounds to form epoxides, among other reactions.

Photosensitized oxidation of certain vinyl ether compounds occurs to prepare stabilized 1,2-dioxetane compounds by a 2+2 cycloaddition reaction. Representative vinyl ethers and the corresponding dioxetane products are disclosed, for example, in U.S. Pat. Nos. 4,857,652, 5,132, 204, 5,248,618, 5,438,146, 5,578,253, 5,603,868, 5,698,727, 5,712,106, 5,731,445, 5,770,743, 5,773,628, 5,929,254, 5,981,768 and 6,133,459 and in PCT Publication WO 00/14092. Photosensitized oxidation of certain vinyl sulfide compounds occurs to prepare sulfur-substituted 1,2-dioxetane compounds by a 2+2 cycloaddition reaction as disclosed in U.S. Pat. No. 5,936,101.

In another aspect, the present invention relates to an improved process for carrying out photosensitized oxidations through the generation of singlet oxygen. The process comprises admixing an oxidizable compound and a polymer-immobilized photosensitizer as described above in a solvent, providing oxygen to the reaction mixture and irradiating the mixture with light to produce singlet oxygen for reaction with the oxidizable compound.

Light sources useful in the practice of the process of the present invention include any source or device which emits light capable of being absorbed by and exciting the photosensitizer to an electronic excited state. The photosensitizers are excited by ultraviolet and visible wavelengths of light so that the light sources must emit some or all of their light in this spectral region. Incandescent lights, fluorescent lights, mercury lamps, sodium lamps, lasers, light emitting diodes and sunlight are all acceptable sources of light.

In many uses of the present process it will be desirable to restrict or filter the range of wavelengths of light which come into contact with the oxidizable compound. Many types of compounds can undergo unwanted photochemical reactions with light of sufficient energy which do not involve reaction with oxygen. To prevent these side reactions, either the light source used must not emit at these wavelengths or it must be excluded by means of a monochromator device or by use of optical filters. In general it is desirable to exclude ultraviolet light having wavelengths shorter than about 400 nm. A preferred light source is a sodium vapor lamp which emits strongly in the yellow region of the spectrum. An optical filter which does not allow ultraviolet light to be transmitted is advantageously placed between the sodium vapor lamp and the reaction mixture to prevent these wavelengths from reaching the oxidizable compound. A convenient optical filter can be prepared from a polyimide polymer sheet sold under the trade name KAPTON by dupont.

Molecular oxygen required may be the dissolved oxygen normally present in solvents or may be supplied additionally by continuously supplying a stream of air or oxygen to the reaction mixture. The latter technique prevents depletion of oxygen during the reaction. Flowing oxygen or air provides additional agitation for suspending the polymer-immobilized photosensitizer if it is present in particulate form.

The photosensitized oxidation process of the present invention can be conducted at any convenient temperature. Cooling is frequently employed to prevent unnecessary warming of the reaction mixture by heat produced by the light source. Reactions may conveniently be conducted in an ice bath, for example. In some uses, such as where an unstable product is formed, it is desirable or necessary to maintain a colder reaction temperature. In these instances the reaction vessel may be cooled by a dry ice cooled bath or a liquid ammonia bath or other known cooling means.

The photosensitized oxidation process of the present invention can be conducted in any convenient solvent which dissolves the oxidizable compound. Useful solvents include water, alcohols such as methanol, ethanol, 2-propanol and the like, ketones including acetone and 2-butanone, ethers including diethyl ether, tetrahydrofuran and p-dioxane, halogenated solvents including methylene chloride, chloroform and carbon tetrachloride, aromatic solvents including benzene, toluene and xylene, aliphatic hydrocarbons, polar aprotic solvents including N,N-di-methylformamide, N-methylpyrrolidone and dimethylsulfoxide.

An important and unexpected feature of the polymer-immobilized photosensitizers used in the present processes is their ability to swell when immersed in the reaction solvent. The polymers used in the present process are observed to swell to a substantially greater degree than previous polymers. Since swelling of a polymer particle would be expected to increase the diameter of internal pores and voids, it may be speculated that this phenomenon improves access of reactants to the immobilized photosensitizer molecules through an increase in the specific surface area of the particles. Alternately, the change in pore size or pore shape or both may assist in forming localized higher concentrations of reactants in proximity to each other on a microscopic scale.

Other uses of singlet oxygen are known including its use in waste water treatment as a bactericide in reducing the levels of harmful or pathogenic microorganisms, virus inactivation for treatment of biomedical products and in photodynamic therapy of cancer treatment. The polymer-immobilized photosensitizers of the present invention thus are seen to be useful in other applications beyond those already described above explicitly and by reference to the documents cited above.

EXAMPLES

Example 1

Synthesis of a Tri-butylphosphonium Substituted Polymer

Merrifield's peptide resin (Aldrich, 1.1 meq/g of Cl), 50.1 g was stirred in 250 mL of $CH_2Cl_2$ with 132.3 g of tri-n-butylphosphine under argon for 1 week. The slurry was filtered and the beads washed with 1.5 L of $CH_2Cl_2$. The product was dried in the air and then under vacuum to produce 61.9 g of tributylphosphonium chloride substituted polymer.

Rose Bengal (20.3 g) was dissolved in 150 mL of methanol. The tributylphosphonium chloride substituted polymer beads (13.3 g) were added to the solution. After stirring the mixture under argon the slurry was filtered and the beads washed with 5×200 mL of methanol. The product was dried in the air to produce 17.2 g of Rose Bengal polymer.

(Note: a chloride analysis of 1.1 meq/g in the Merrifield resin calculates to 1 monomer out of every 8–9 monomer units being chloromethylated).

Example 2

Synthesis of a Tri-butylammonium Substituted Polymer

Merrifield's peptide resin, 25.1 g (Aldrich, 1.43 meq/g of Cl) was stirred in 150 mL of $CH_2Cl_2$ with 25.5 g (3.9 eq.) of tri-n-butylamine for 8 days. The slurry was filtered and the beads washed with 2×250 mL of $CH_2Cl_2$. The product is dried in the air and then under vacuum to produce the tributylammonium chloride substituted polymer.

Rose Bengal (17.45 g, 17.15 mol) was dissolved in 150 mL of methanol. The tributylammonium chloride substituted polymer beads (10.0 g, 11.3 meq) were added to the solution. The mixture was stirred over night and the slurry filtered. The beads were washed with methanol until the washes were colorless. The product was dried in the air to produce 12.85 g the Rose Bengal polymer.

Example 3

Synthesis of a Tri-octylphosphonium Substituted Polymer

Merrifield's peptide resin (Aldrich, 1.1 meq/g of Cl), 20.0 g was stirred in a solution of 100 mL of $CH_2Cl_2$ and 100 mL of dry DMF with 92.4 g of tri-n-octylphosphine under argon. The slurry was filtered and the beads washed with 3×200 mL of $CH_2Cl_2$. The product was dried in the air and then under vacuum to produce 21.2 g of trioctylphosphonium chloride substituted polymer.

Rose Bengal (1.41 g) was dissolved in 15 mL of methanol. The trioctylphosphonium chloride substituted polymer beads (1.0 g) suspended in 3 mL of methanol were added to the solution. After sonicating the mixture for 2 hours the slurry was filtered and the beads washed with water followed by repeated washes with methanol until the washes were colorless. The product was dried in the air to produce 1.04 g of Rose Bengal polymer.

Example 4

Photosensitized Oxidation of a Vinyl Ether

The polymer-immobilized Rose Bengal polymer beads prepared as described in Example 1 were used in the photosensitized oxidation of a water-soluble phosphate-protected vinyl ether compound to produce the dioxetane Lumigen PPD.

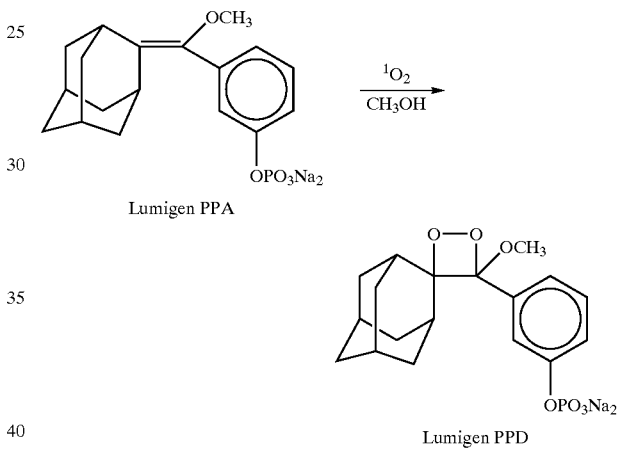

[(3-Phosphoryloxyphenyl)-methoxymethylene]adamantane, disodium salt (0.40 g) in 8 mL of methanol and 40 mg of the Rose Bengal polymer were cooled in an ice bath and irradiated with a 400 W sodium lamp through a 0.005" Kapton filter under continuous oxygen bubbling. Samples were withdrawn at 5 min intervals and diluted 1/200 before analysis by HPLC to determine the rate of consumption of the starting vinyl ether. Separation was performed on a Varian Microsorb-MV 4.6×150 mm $C_{18}$ column. The mobile phase was $H_2O/CH_3OH$ (70/30) containing 10 mM ammonium hydroxide and was pumped at 1.0 mL/min. Peak elution was detected by absorption at 275 nm. A peak corresponding to the vinyl ether eluted at 4.6 min while a peak eluting at 2.6 min corresponded to the dioxetane product.

Example 5

Synthesis of a Tri-butylphosphonium Substituted Polymer with Covalently Linked Rose Bengal Merrifield's peptide resin (Aldrich, 1.1 meq/g of Cl), 24.52 g was slurried in 200 mL of DMF with Rose Bengal (1.98 g) and heated at 60° C. for 96 hours under argon. The slurry was filtered and the beads washed with 4×200 mL of methanol. The product was dried in the air and then under vacuum to produce 25.3 g of Rose Bengal substituted polymer. The amount of dye used represents 5% of the available reactive groups.

Tri-n-butylphosphine (56.43 g) was dissolved in 250 mL of $CH_2Cl_2$. The Rose Bengal-substituted polymer beads prepared above (24.46 g) were added to the solution. After stirring the mixture under argon, the slurry was filtered and the beads washed with 3×250 mL of $CH_2Cl_2$. The product was dried in the air to produce 32.56 g of polymer.

Following this procedure but adjusting the amount of Rose Bengal reacted in the first step to represent 20%, 1% and 0.1% of the available reactive groups allowed the preparation of analogous polymers with different amounts of sensitizing dyes.

Example 6

Comparison of Photosensitized Oxidation Using a Known Polymeric Photosensitizer The polymer-immobilized sensitizers of Examples 1, 2 and 3 were compared in the photooxygenation of the vinyl ether Lumigen PPA with an anion exchange polymer (Control) to which is immobilized Rose Bengal. The latter polymer was prepared as described in U.S. Pat. No. 4,104,204 and contains trimethylammonium head groups. FIG. 1 depicts the time course of the reaction with the polymers of Example 1 and the control.

TABLE 1

Comparative Rates of Photooxygenation.

| Time | Vinyl Ether Peak Areas | | | |
|---|---|---|---|---|
| (min) | Ex. 1 | Ex. 2 | Ex. 3 | Control |
| 0 | 133914 | 117575 | 134921 | 133914 |
| 5 | 66876 | 29520 | 68784 | 90466 |
| 10 | 32715 | 1522 | 36875 | 69099 |
| 15 | 0 | 0 | 13224 | 59472 |
| 20 | | | 4917 | 47048 |
| 25 | | | 1817 | 36601 |
| 30 | | | 617 | 22783 |

It can be seen that the rate of reaction of the vinyl ether with the polymers of Example 1, 2 and 3 were substantially higher than the control reaction. Beside the time saving, another advantage is the lack of decomposition of the dioxetane product. Extended irradiation times during this reaction lead to decomposition of the dioxetane to products resulting from fragmentation of the dioxetane ring.

Example 7

The polymer-immobilized Rose Bengal polymer prepared as described in Example 1 was used in the photosensitized oxidation of a non-water-soluble vinyl ether compound in a non-polar solvent.

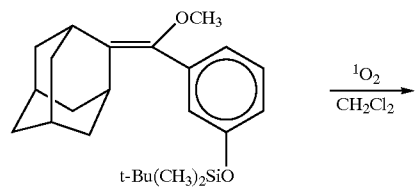

-continued

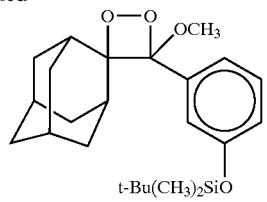

[(3-tert-Butyldimethylsilyloxyphenyl) methoxymethylene]-adamantane (0.10 g) in 7 mL of methylene chloride and 40 mg of the Rose Bengal polymer of Example 1 were cooled in a dry ice bath to −78 C. and irradiated with a 400 W sodium lamp through a 0.005" Kapton filter under continuous oxygen bubbling. A sample was withdrawn after 26 min, evaporated and redissolved in $CDCl_3$ for $^1H$ NMR analysis. The spectrum indicated that the vinyl ether had been completely converted to the dioxetane.

Example 8

Samples of four polymer-immobilized sensitizers were evaluated in a test comparing the ability of the polymers to remain suspended in methanol solution. It is believed that this property may reflect the degree of swelling of the polymer particles and/or the effectiveness as a photosensitizer. The four polymers which were compared were:

A—the trimethylammonium polymer of Example 6,
B—the tributylphosphonium polymer of Example 1,
C—the trioctylphosphonium polymer of Example 3,
D—the tributylphosphonium polymer of Example 5.

Settling time of a suspension of each of the polymers was measured by measuring the rate of decrease of fluorescence of a stirred mixture upon stopping the magnetic stirrer. A 4 mL polymethacrylate cuvette was charged with 3.0 mL of methanol, 25 mg of the polymer and a magnetic stir bar. The cuvette was placed in the sample compartment of a Spex FluoroMax-3 spectrofluorometer with the stirrer set on the maximum speed. Fluorescence was monitored with an excitation wavelength of 530 nm, an emission wavelength of 640 nm using 4 nm bandpass slits. Fluorescence intensity was measured at 1 second intervals from the point in time at which the stirrer was stopped.

Polymer A exhibited a nearly instant rapid drop of fluorescence as soon as stirring ceased reflecting the rapid settling of this polymer (FIG. 2). Polymers B–D of the invention demonstrated either a substantially longer settling time or a stable suspension of a portion of the polymer or both behaviors.

Example 9

The polymer-immobilized Rose Bengal beads prepared as described in Example 5 were used in the photosensitized oxidation of a water-soluble phosphate-protected vinyl ether compound below to produce the dioxetane.

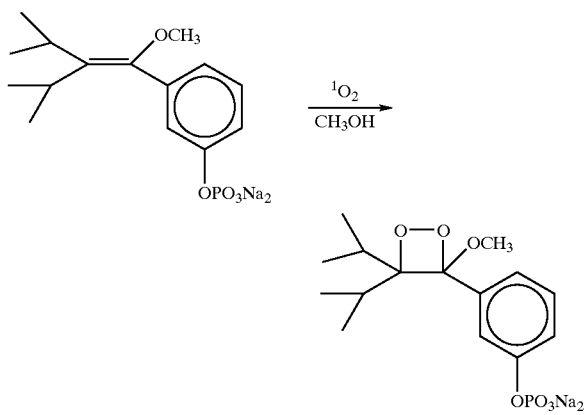

2,2-Diisopropyl-1-methoxy-1-(3-phosphoryloxyphenyl) ethene, disodium salt (0.20 g) in 9 mL of methanol and 44.6 mg of the Rose Bengal polymer of Example 5 were cooled in an ice bath and irradiated with a 400 W sodium lamp through a 0.005" Kapton filter under continuous oxygen bubbling. A sample was withdrawn after 15 min and analyzed by $^1$H NMR. The starting vinyl ether had been completely converted to dioxetane.

In contrast, it was reported in U.S. Pat. No. 5,578,253 that photooxygenation of this vinyl ether using a soluble sensitizer required 1.5 hours and use of an expensive solvent $D_2O$. Other reaction conditions were reported to take substantially longer reaction times.

Example 10

Comparison of Photosensitized Oxidation Using a Known Polymeric Photosensitizer Three of the polymer-immobilized sensitizers of Example 5 nominally containing 20%, 5% and 1% replacement of active groups by Rose Bengal were compared in the photooxygenation of the vinyl ether Lumigen PPA with the trimethylammonium polymer (Control) as described in Example 6.

TABLE 2

Comparative Rates of Photooxygenation.

| Time (min) | Vinyl Ether Peak Areas | | | |
|---|---|---|---|---|
| | "20%" | "5%" | "1%" | Control |
| 0 | 117575 | 140552 | 117575 | 133914 |
| 5 | 50905 | 12774 | 74466 | 90466 |
| 10 | 10386 | 1261 | 36268 | 69099 |
| 15 | 0 | 0 | 2319 | 59472 |
| 20 | | | 0 | 47048 |
| 25 | | | | 36601 |
| 30 | | | | 22783 |

It is seen that the photooxygenation proceeded at a much higher rate with each of the polymers of the invention compared to the control polymer-immobilized sensitizer.

It is intended that the foregoing description be only illustrative of the present invention and that the present invention be limited only by the appended claims.

We claim:

1. A polymer-immobilized photosensitizer comprising a cross-linked polymer backbone to which is bound a plurality of anionic photosensitizer groups and a plurality of cationic groups $^+QR_3$ wherein Q is selected from phosphorus and nitrogen, each R is independently a straight, branched or cyclic alkyl group of 1 to about 20 carbons or an aralkyl group and the average total number of carbon atoms in the group $QR_3$ is at least four.

2. The polymer-immobilized photosensitizer of claim 1 wherein the average total number of carbon atoms in the group $QR_3$ is from 4 to about 40.

3. The polymer-immobilized photosensitizer of claim 1 wherein the average total number of carbon atoms in the group $QR_3$ is from 12 to about 30.

4. The polymer-immobilized photosensitizer of claim 1 wherein all groups $QR_3$ are identical.

5. The polymer-immobilized photosensitizer of claim 1 comprising at least two different groups $QR_3$.

6. The polymer-immobilized photosensitizer of claim 4 wherein Q is a phosphorus atom.

7. The polymer-immobilized photosensitizer of claim 1 wherein the photosensitizer group is selected from Rose Bengal, Eosin Y, Alizarin Red S, Congo Red, Orange G, fluorescein dyes, rhodamine dyes, Erythrosin B, chlorophyllin trisodium salt, salts of hemin, hematoporphyrin, Methylene Blue, Crystal Violet and Malachite Green.

8. The polymer-immobilized photosensitizer of claim 1 wherein the photosensitizer group is Rose Bengal.

9. The polymer-immobilized photosensitizer of claim 1 wherein the photosensitizer groups are covalently linked to the polymer backbone through linker groups.

10. The polymer-immobilized photosensitizer of claim 1 wherein the photosensitizer groups are bound to the polymer by electrostatic attraction to the cationic groups.

11. The polymer-immobilized photosensitizer of claim 1 wherein Q is a phosphorus atom, the average total number of carbon atoms in the group $QR_3$ is from 12 to about 30 and the photosensitizer group is Rose Bengal.

12. The polymer-immobilized photosensitizer of claim 1 having the formula:

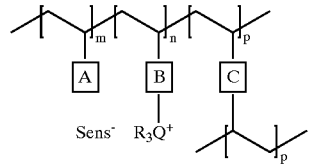

wherein A, B and C together with the two carbons of the polymer chain represent ethylenically unsaturated monomer units which can include alkyl substituents on the chains, A is a monovalent group selected from hydrogen, halogen, alkyl, aryl, aralkyl, carboxyl ester —COOR, oxycarbonyl, —OC(=O)R, and carboxamide —C(=O)NR$_2$, B and C are each either a bond or a divalent linker group selected from alkylene, arylene, aralkylene, carboxyl —COO—, oxycarbonyl, —OC(=O)—, and carboxamide —C(=O) NR—, wherein m, n and p represent the mole fraction of the respective monomer units wherein p is from about 0.01 to about 0.1, m is from 0 to about 0.95, n is from about 0.05 to about 0.95, wherein Q is selected from phosphorus and nitrogen, each R is independently a straight, branched or cyclic alkyl group of 1 to about 20 carbons or an aralkyl group and the average total number of carbon atoms in the group $QR_3$ is at least 4 and Sens is an anionic photosensitizer group.

13. The polymer-immobilized photosensitizer of claim 12 having the formula:

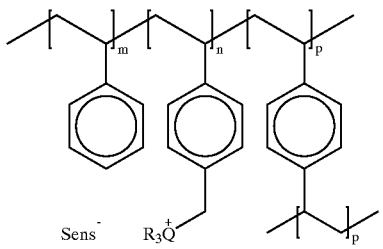

wherein A is a phenyl group, B is a benzyl group, C is a p-phenylene group.

14. The polymer-immobilized photosensitizer of claim 13 wherein Q is a phosphorus atom, the average total number of carbon atoms in the group $QR_3$ is from 12 to about 30 and the photosensitizer group is Rose Bengal.

15. The polymer-immobilized photosensitizer of claim 1 having the formula:

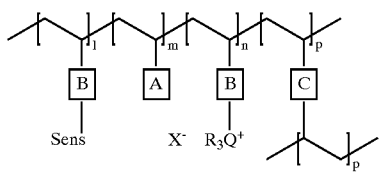

wherein A, B and C together with the two carbons of the polymer chain represent ethylenically unsaturated monomer units which can include alkyl substituents on the chains, A is a monovalent group selected from hydrogen, halogen, alkyl, aryl, aralkyl, carboxyl ester —COOR, oxycarbonyl, —OC(=O)R, and carboxamide —C(=O)NR$_2$, B and C are each either a bond or a divalent linker group selected from alkylene, arylene, aralkylene, carboxyl —COO—, oxycarbonyl, —OC(=O)—, and carboxamide —C(=O)NR—, wherein l, m, n and p represent the mole fraction of the respective monomer units wherein p is from about 0.01 to about 0.1, m is from 0 to about 0.95, n is from about 0.05 to about 0.95, l is from about 0.05 to about 0.95, wherein Q is selected from phosphorus and nitrogen, each R is independently a straight, branched or cyclic alkyl group of 1 to about 20 carbons or an aralkyl group and the average total number of carbon atoms in the group $QR_3$ is at least 4, wherein X is selected from halide and sulfonate ester and Sens is a photosensitizer group.

16. The polymer-immobilized photosensitizer of claim 15 having the formula:

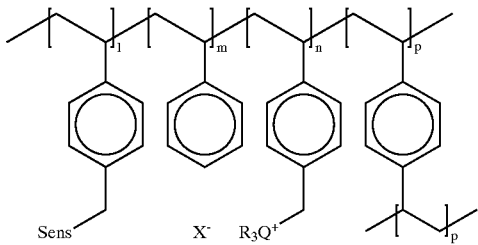

wherein in the precursor polymer, A is a phenyl group, B is a benzyl group, C is a p-phenylene group, wherein p is from 0.01 to about 0.1, m is from 0.5 to 0.95, l and n are each from about 0.05 to about 0.5.

17. The polymer-immobilized photosensitizer of claim 16 wherein Q is a phosphorus atom, the average total number of carbon atoms in the group $QR_3$ is from 12 to about 30 and the photosensitizer group is Rose Bengal.

18. A polymer-immobilized photosensitizer prepared by
a) providing a precursor polymer having the formula

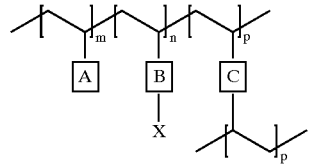

wherein A, B and C together with the two carbons of the polymer chain represent ethylenically unsaturated monomer units which can include alkyl substituents on the chains, A is a monovalent group selected from hydrogen, halogen, alkyl, aryl, aralkyl, carboxyl ester —COOR, oxycarbonyl, —OC(=O)R, and carboxamide —C(=O)NR$_2$, B and C are each either a bond or a divalent linker group selected from alkylene, arylene, aralkylene, carboxyl —COO—, oxycarbonyl, —OC(=O)—, and carboxamide —C(=O)NR—, X is a reactive leaving group capable of being displaced in a nucleophilic displacement reaction, m, n and p represent the mole fraction of the respective monomer units wherein p is from about 0.01 to about 0.1, m is from 0 to about 0.95, n is from about 0.05 to about 0.95;

b) reacting the polymer with at least 1 amine or phosphine of the formula $QR_3$, wherein Q is selected from phosphorus and nitrogen, each R is independently a straight, branched or cyclic alkyl group of 1 to about 20 carbons or an aralkyl group provided that the average total number of carbon atoms in the group $QR_3$ is from 4 to about 40, to produce a cationic polymer in which some of the reactive groups are converted to quaternary ammonium or phosphonium groups $^+QR_3X^-$; and c) reacting the resulting polymer with an anionic photosensitizer to substantially exchange the anion $X^-$ for the sensitizer Sens$^-$ producing the polymer-immobilized photosensitizer.

19. The polymer-immobilized photosensitizer prepared by the process of claim 18 wherein the reactive groups are substantially converted to quaternary ammonium or phosphonium groups $^+QR_3X^-$.

20. The polymer-immobilized photosensitizer prepared by the process of claim 18 wherein Sens$^-$ is selected from Rose Bengal, Eosin Y, Alizarin Red S, Congo Red, Orange G, fluorescein dyes, rhodamine dyes, Erythrosin B, chlorophyllin trisodium salt, salts of hemin and hematoporphyrin.

21. The polymer-immobilized photosensitizer prepared by the process of claim 18 wherein Sens$^-$ is Rose Bengal.

22. The polymer prepared by the process of claim 18 wherein the average total number of carbon atoms in the group $QR_3$ is from about 12 to about 30.

23. The polymer prepared by the process of claim 18 wherein only one compound $QR_3$ is used and each R is an alkyl group.

24. The polymer prepared by the process of claim 18 wherein more than one compound $QR_3$ is used and each R is an alkyl group.

25. The polymer-immobilized photosensitizer prepared by the process of claim 18 wherein in the precursor polymer, A is a phenyl group, B is a benzyl group, C is a p-phenylene group and having the formula:

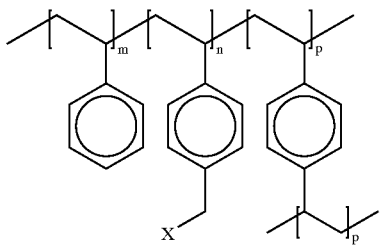

wherein the amount of cross-linking (p) is from about 0.1 to about 0.01, m is from about 0.75 to about 0.95, n is from about 0.05 to about 0.25 and the group X is a halogen atom.

26. The polymer-immobilized photosensitizer prepared by the process of claim 25 wherein Sens⁻ is selected from Rose Bengal, Eosin Y, Alizarin Red S, Congo Red, Orange G, fluorescein dyes, rhodamine dyes, Erythrosin B, chlorophyllin trisodium salt, salts of hemin and hematoporphyrin.

27. The polymer-immobilized photosensitizer prepared by the process of claim 25 wherein Sens⁻ is Rose Bengal.

28. The polymer prepared by the process of claim 25 wherein the average total number of carbon atoms in the group $QR_3$ is from 4 to about 40.

29. The polymer prepared by the process of claim 25 wherein the average total number of carbon atoms in the group $QR_3$ is from about 12 to about 30.

30. The polymer prepared by the process of claim 25 wherein only one compound $QR_3$ is used and each R is an alkyl group.

31. The polymer prepared by the process of claim 25 wherein more than one compound $QR_3$ is used and each R is an alkyl group.

32. The polymer prepared by the process of claim 25 wherein only one compound $QR_3$ is used and each R is an alkyl group, the average total number of carbon atoms in the group $QR_3$ is from 12 to about 30, and Sens⁻ is Rose Bengal.

33. A polymer-immobilized photosensitizer prepared by
a) providing a precursor polymer having the formula

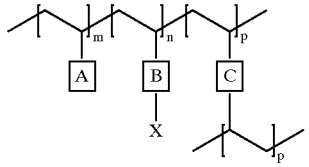

wherein A, B and C together with the two carbons of the polymer chain represent ethylenically unsaturated monomer units which can include alkyl substituents on the chains, A is a monovalent group selected from hydrogen, halogen, alkyl, aryl, aralkyl, carboxyl ester —COOR, oxycarbonyl, —OC(=O) R, and carboxamide —C(=O)NR₂, B and C are each either a bond or a divalent linker group selected from alkylene, arylene, aralkylene, carboxyl —COO—, oxycarbonyl, —OC(=O)—, and carboxamide —C(=O)NR—, X is a reactive leaving group capable of being displaced in a nucleophilic displacement reaction, m, n and p represent the mole fraction of the respective monomer units wherein p is from about 0.01 to about 0.1, m is from 0 to about 0.95, n is from about 0.05 to about 0.95;
b) reacting the precursor polymer with
1) a specified limiting amount of a photosensitizer in a solvent to effect covalent bonding of the photosensitizer to the polymer by displacement of some of the leaving groups and
2) at least 1 amine or phosphine of the formula $QR_3$, wherein Q is selected from phosphorus and nitrogen, each R is independently a straight, branched or cyclic alkyl group of 1 to about 20 carbons or an aralkyl group provided that the average total number of carbon atoms in the group $QR_3$ is at least four, to displace additional leaving groups with $QR_3$ thereby forming quaternary ammonium or phosphonium groups ⁺QR₃X⁻.

34. The polymer-immobilized photosensitizer prepared by the process of claim 33 wherein in the precursor polymer, A is a phenyl group, B is a benzyl group, C is a p-phenylene group and having the formula:

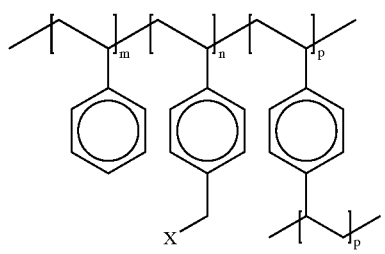

wherein the amount of cross-linking (p) is from about 0.1 to about 0.01, m is from about 0.75 to about 0.95, n is from about 0.05 to about 0.25 and the group X is a halogen atom.

35. The polymer-immobilized photosensitizer prepared by the process of claim 33 wherein the limiting amount of photosensitizer molecules results in displacement of from about 0.01% to about 50% of the reactive groups X.

36. The polymer-immobilized photosensitizer prepared by the process of claim 33 wherein the limiting amount of photosensitizer molecules results in displacement of from about 0.1% to about 20% of the reactive groups X.

37. The polymer-immobilized photosensitizer prepared by the process of claim 33 wherein in the second step at least 50% of the available reactive groups are displaced with $QR_3$.

38. The polymer-immobilized photosensitizer prepared by the process of claim 33 wherein in the second step the available reactive groups are substantially completely displaced with $QR_3$.

39. The polymer prepared by the process of claim 33 wherein Sens⁻ is selected from Rose Bengal, Eosin Y, Alizarin Red S, Congo Red, Orange G, fluorescein dyes, rhodamine dyes, Erythrosin B, chlorophyllin trisodium salt, salts of hemin, hematoporphyrin, Methylene Blue, Crystal Violet and Malachite Green.

40. The polymer-immobilized photosensitizer prepared by the process of claim 33 wherein Sens⁻ is Rose Bengal.

41. The polymer-immobilized photosensitizer prepared by the process of claim 33 wherein the average total number of carbon atoms in the group $QR_3$ is from 4 to about 40.

42. The polymer-immobilized photosensitizer prepared by the process of claim 33 wherein the average total number of carbon atoms in the group $QR_3$ is from about 12 to about 30.

43. The polymer-immobilized photosensitizer prepared by the process of claim 33 wherein only one compound $QR_3$ is used and each R is an alkyl group.

44. The polymer-immobilized photosensitizer prepared by the process of claim 33 wherein more than one compound $QR_3$ is used and each R is an alkyl group.

45. The polymer-immobilized photosensitizer prepared by the process of claim 33 wherein the precursor polymer is first reacted with the limiting amount of the photosensitizer and then with the amines or phosphines $QR_3$.

46. The polymer-immobilized photosensitizer prepared by the process of claim 34 wherein only one compound $QR_3$ is used, each R is an alkyl group, the average total number of carbon atoms in the group $QR_3$ is from 12 to about 30, $Sens^-$ is Rose Bengal, wherein the limiting amount of photosensitizer molecules results in displacement of from about 0.1% to about 20% of the reactive groups X, and wherein in the second step the available reactive groups are substantially completely displaced with $QR_3$.

* * * * *